US012159608B2

(12) United States Patent
Esparza et al.

(10) Patent No.: US 12,159,608 B2
(45) Date of Patent: Dec. 3, 2024

(54) FRET PRESS SYSTEM

(71) Applicant: Fender Musical Instruments Corporation, Scottsdale, AZ (US)

(72) Inventors: Eric Esparza, Corona, CA (US); Ferenc Koszegfalvi, Riverside, CA (US); George Blanda, Corona, CA (US)

(73) Assignee: Fender Musical Instruments Corporation, Scottsdale, AZ (US)

( * ) Notice: Subject to any disclaimer, the term of this patent is extended or adjusted under 35 U.S.C. 154(b) by 176 days.

(21) Appl. No.: 17/826,883

(22) Filed: May 27, 2022

(65) Prior Publication Data

US 2022/0383837 A1 Dec. 1, 2022

Related U.S. Application Data

(60) Provisional application No. 63/202,151, filed on May 28, 2021.

(51) Int. Cl.

| | |
|---|---|
| ***G10D 3/22*** | (2020.01) |
| ***G10D 1/08*** | (2006.01) |
| ***G10D 3/04*** | (2020.01) |
| ***G10D 3/06*** | (2020.01) |

(52) U.S. Cl.

CPC ................. *G10D 3/22* (2020.02); *G10D 1/08* (2013.01); *G10D 3/04* (2013.01); *G10D 3/06* (2013.01)

(58) Field of Classification Search

CPC .. G10D 3/22; G10D 1/08; G10D 3/04; G10D 3/06; G10D 1/05

See application file for complete search history.

(56) References Cited

U.S. PATENT DOCUMENTS

| | | | |
|---|---|---|---|
| 5,616,873 | A | 4/1997 | Fishman et al. |
| 8,246,461 | B2 | 8/2012 | Chiu et al. |
| 8,469,812 | B2 | 6/2013 | Chiu et al. |
| 8,878,042 | B2 | 11/2014 | Van Wagoner et al. |
| 10,573,281 | B2 | 2/2020 | Finkle |

FOREIGN PATENT DOCUMENTS

FR 20040069732 A * 1/2013 ............. E06B 9/264

OTHER PUBLICATIONS https://www.instagram.com/p/CRJIh3fsRSw/ https://elevatelutherie.com/product/fret-press-system/, All 2021 (Year: 2021).*

* cited by examiner

*Primary Examiner* — Kimberly R Lockett

(74) *Attorney, Agent, or Firm* — Hall Estill Law Firm

(57) ABSTRACT

A fret press system can install one or more frets in grooves of a substrate with a press connected to a caul. The fret may be positioned atop the groove prior to contacting the fret with a caul by operating the press. The fret may initially be forced into the groove with the caul with a first pressure before an incorrect fret position in the groove is detected with a sensor connected to the press. The caul can then be adjusting to correct the sensed incorrect fret position and subsequently used to finish installing the fret in the groove prior to a position of the fret in the groove being confirmed with the sensor.

20 Claims, 4 Drawing Sheets

FRET PRESS SYSTEM

RELATED APPLICATION

The present application makes a claim of domestic priority to U.S. Provisional Patent Application No. 63/202,151 filed May 28, 2021, the contents of which are hereby incorporated by reference.

SUMMARY

Some embodiments of a fret press system install one or more frets in grooves of a substrate with a press connected to a caul. The fret is positioned atop the groove prior to contacting the fret with a caul by operating the press. The fret is forced into the groove with the caul with a first pressure. An incorrect fret position in the groove may be detected with a sensor connected to the press. The caul may then be adjusted to correct the sensed incorrect fret position and subsequently used to finish installing the fret in the groove prior to a position of the fret in the groove being confirmed with the sensor.

A fret press system, in further embodiments, has a caul positionable over a groove in a substrate, with the caul having a plurality of pressing surfaces arranged to distribute pressure from a press across a surface of a fret while the fret is inserted into the groove. A dynamic suspension for each of the plurality of pressing surfaces may be used to provide optimal pressing characteristics that reliably insert the fret into the groove with the caul.

DETAILED DESCRIPTION

The present disclosure is generally directed to a system that intelligently installs a fret into a groove of a substrate, which can provide faster and more accurate fabrication of assorted components and instruments, such as a guitar, bass, mandolin, or banjo.

Through the manual selection of a tensioned string, an acoustic frequency is produced, which can be used to produce sound and/or music. Adjustment of a tensioned length of a string can allow a single string to create a variety of different acoustic frequencies. However, stable and consistent string length adjustment can be difficult to establish and/or maintain without the use of a fret, particularly with relatively larger diameter strings. While a fret can allow a user to efficiently utilize the dynamic acoustic frequency capabilities of a string, the proper installation of a fret can be laborious and imprecise due to the physical alignment and pressures associated with frets properly seated in a groove relative to a suspended, tensioned string.

Accordingly, various embodiments of a fret press system can provide increased fret installation efficiency and accuracy through the use of a caul. Intelligent automation of some, or all, of a fret installation process can utilize sensed conditions to adjust the use of one or more cauls to position a fret in a groove of a substrate. It is contemplated that embodiments of an automated fret press can provide userless automation of some, or all, of the installation of a pre-finished fret into the neck of an instrument, such as a guitar, bass, mandolin, or banjo. The ability to automate portions of fret installation allows for greater fabrication throughput than manual fret fitting and provides verified fabrication accuracy that results in higher assembly quality.

Figure 1:
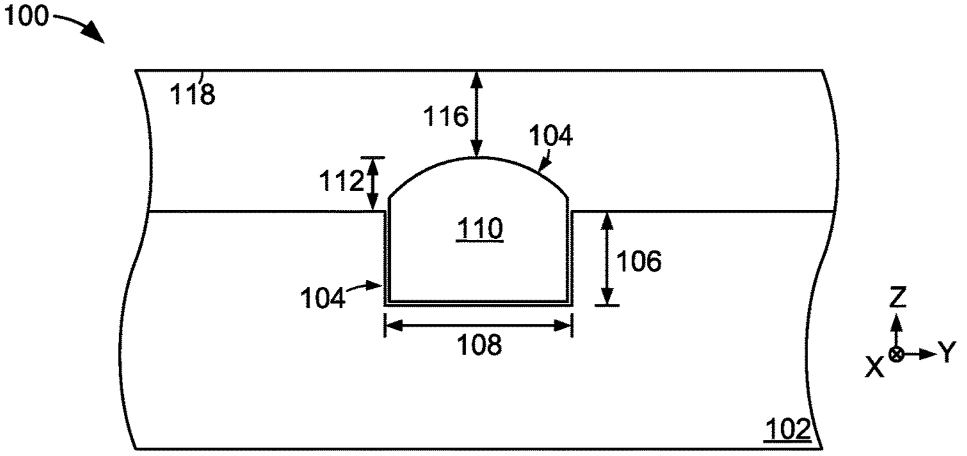
FIG. 1 depicts portions of a fret environment in which assorted embodiments may be practiced.

Turning to the drawings, FIG. 1 depicts a block representation of an example fret environment 100 in which various embodiments can be practiced. The environment 100 employs a substrate 102, which may be any material, such as metal, wood, ceramic, polymer, ceramic, stone, or any combination thereof, that has one or more grooves 104. Each groove 104 can be defined by sidewalls continuously extending into the substrate 102 a predetermined depth 106. The respective groove sidewalls can be continuously linear, curvilinear, or a combination thereof that meet at a bottom surface having a predetermined width 108 to provide an unlimited cross-sectional shape and size.

As shown, a fret 110 is positioned within a groove 104 and extends to a height 112 above the substrate 102 that is tuned to present a pressing surface 114 a select distance 116 from a tensioned string 118. It is contemplated that the fret 110 fully fills the groove 104 and leaves no empty space between the sidewalls and bottom of the groove 104 and the exterior surface of the fret 110, which corresponds with the fret 110 being press fit into the groove 104. The ability to contact the sidewalls and bottom of the groove 104 with the fret 110 allows friction to hold the fret 110 in place. However, adhesive may be used to additionally retain the fret 110 in the groove 104, in some embodiments.

Figure 2:
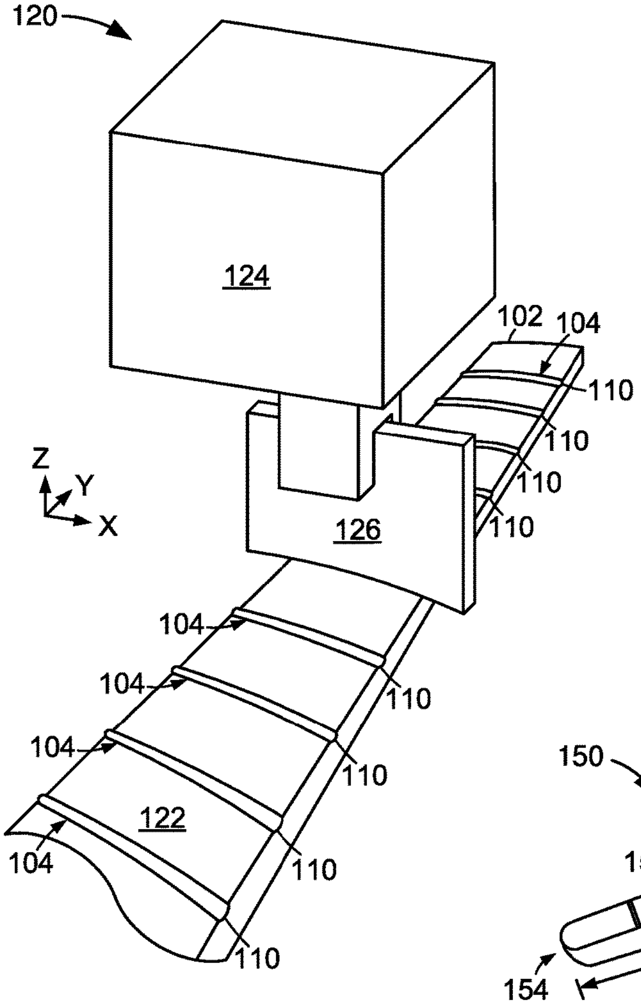
FIG. 2 displays aspects of an example stringed instrument in which embodiments of a fret can be utilized in accordance with some embodiments.

FIG. 2 depicts a line representation of portions of an example stringed instrument 120 in which a fret 110 can be installed and utilized in accordance with various embodiments. A neck 122 of an instrument 120, such as a guitar, bass, banjo, or mandolin, employs multiple frets 110 separated and inserted in respective grooves 104 that may have uniform, or dissimilar, cross-sectional shapes, sizes, depths, or widths. While a fret 110 may be manually forced into each groove 104 with a tool, as illustrated by the hammer (H) of FIG. 1, such fret 110 installation can be tedious, imprecise, and laborious. Alternatively, frets 110 can be physically forced into the respective grooves 104 by a manual or automated press 124, as conveyed in FIG. 2.

A press 124 can provide leveraged and/or supplemental mechanical force that is applied to a fret 110 via a caul 126. Although not required or limiting, the caul 126 can be shaped to continuously contact a fret 110 during the application of force from the press 124. While use of a manual, or automatic, press 124 can mitigate some issues associated with tool-based fret installation, time consuming difficulties can remain. For instance, lateral alignment of a fret 110, along the X axis, can be difficult with a caul 126, particularly with neck 122 materials, such as wood, that have varying densities along its length, as measured along the Y axis. The use of supplemental mechanical force with the press 124, such as hydraulic, pneumatic, and/or mechanical leverage, can pose difficulties with uniform application of force along a fret 110 being installed due to the fret 110 not moving into the groove 104 uniformly and/or consistently.

As a result of the difficulties associated with using the press 124 and caul 126, manual correction and/or supplementation is often needed to provide proper fret 110 seating and alignment in the respective grooves 104 to provide a predetermined distance from a top/pressing surface of the respective frets 110 to a tensioned string. That is, manual manipulation and/or dressing of frets 110 may be required after caul/press installation that involves filing, snipping, hammering, or otherwise moving a fret 110 within a groove 104. These additional manual processing of frets 110 can be particularly acute with pre-finished frets and/or frets that are constructed of relatively harder materials, such as stainless steel frets, that correspond with more installation pressure than softer fret materials, such as nickel silver frets.

Figure 3A:
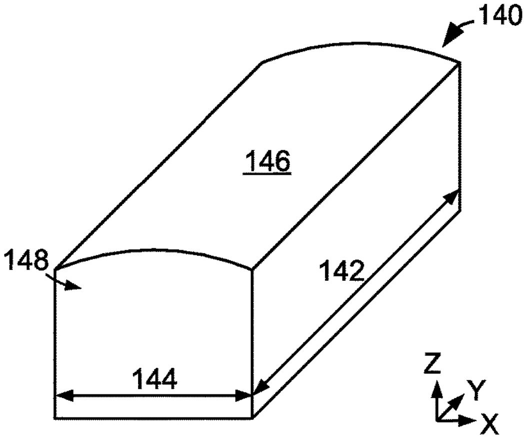
FIGS. 3A & 3B respectively depict example frets configured in accordance with various embodiments.
Figure 3B:
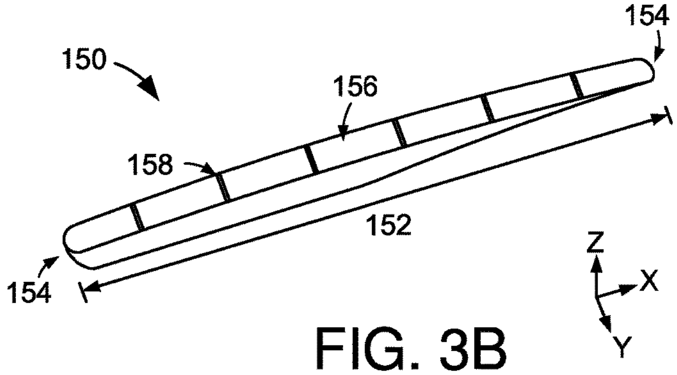

FIGS. 3A & 3B respectively illustrate example frets 140/150 that can be installed in a substrate groove 104 in accordance with assorted embodiments. The first fret 140 has a uniform length 142, width 144, and cross-sectional shape throughout that presents a pressing surface 146 for engagement with a tensioned string. The first fret 140 has square ends 148 that can be formed via a linear cut before, or after, the fret 140 is installed in a substrate groove. It is contemplated that the pressing surface 146 has a smooth surface free of any notches, indentions, or protrusions that present a consistent linear or curvilinear surface throughout the fret's length 142. The configuration of the first fret 140 allows for efficient mass production due to uniform shape, size, and cross-sectional shape along with robust customization capabilities either before or after the fret 140 is present in a substrate groove. Yet, the capabilities and advantages of the first fret 140 can correspond with increased fabrication time, such as shaping, cutting, and filing, once installed into a groove, which can decrease the overall efficiency of assembling frets into a component, such as a stringed instrument.

FIG. 3B depicts an example pre-finished fret 150 that has a predefined length 152 terminating in continuously curvilinear ends 154. It is noted that the curvilinear ends 154 on opposite sides of the fret 150 may have matching or dissimilar shapes and/or sizes that are created prior to installation into a substrate groove. The customization of the pre-finished fret 150 may additionally involve a dynamic pressing surface 156 presenting multiple different string regions 158. For instance, the pressing surface 156 may have differently radiused shapes arranged to contact strings with different diameters. The pressing surface 156, in some embodiments, has notches 158 positioned to control where, and how, string contact is established and maintained by a user.

With a substrate, such as an instrument neck, that concurrently employs separate frets, the respective frets can be differently configured. For instance, separate frets may have different lengths, shapes of rounded ends, and pressing surface shapes. Such customization can provide dynamic string engagement throughout the length of a substrate. While it is noted that fret customizations can be done after a fret has been installed in a groove, such a process can be time consuming and imprecise. Hence, pre-finished frets 150 provide customized fret configurations, and the ability to use relatively harder fret materials, without the time consuming labor and fret processing of post-installation fret customization. However, the use of pre-finished frets 150 emphasizes the accuracy of precision of fret installation, which is addressed by assorted embodiments of a fret press system.

Figure 4A:
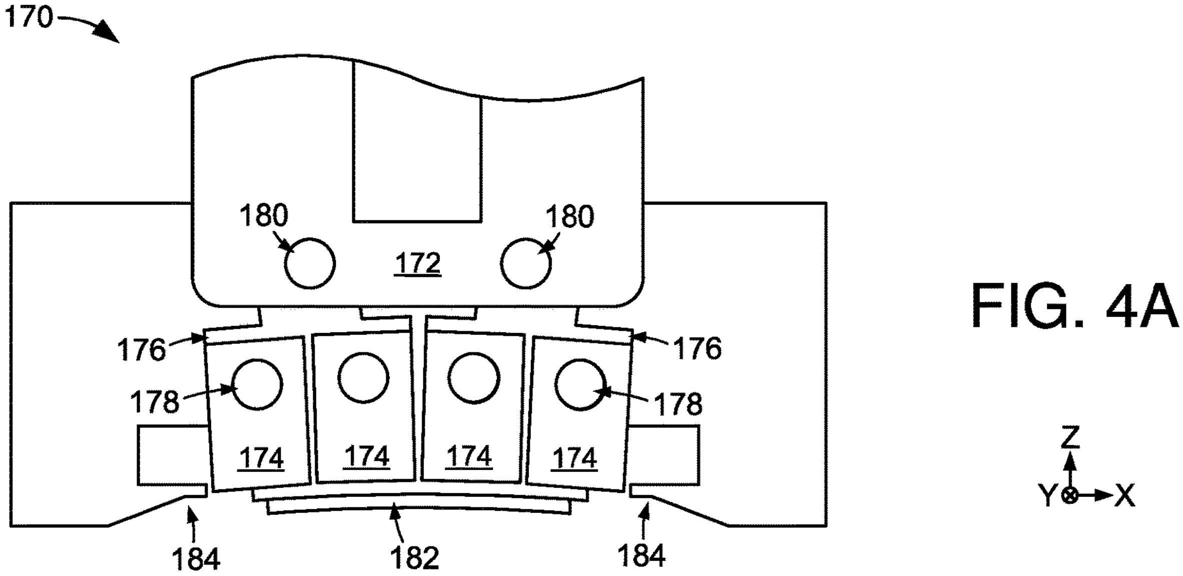
FIGS. 4A-4C respectively show an example caul that can be employed to install a fret in accordance with assorted embodiments.
Figure 4B:
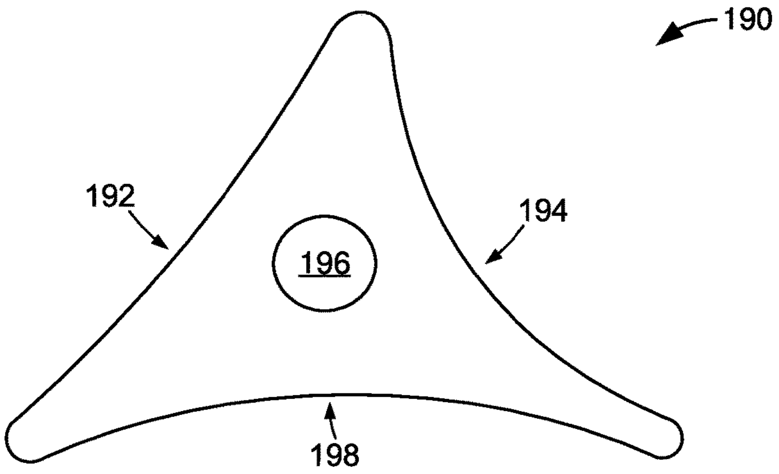
Figure 4C:
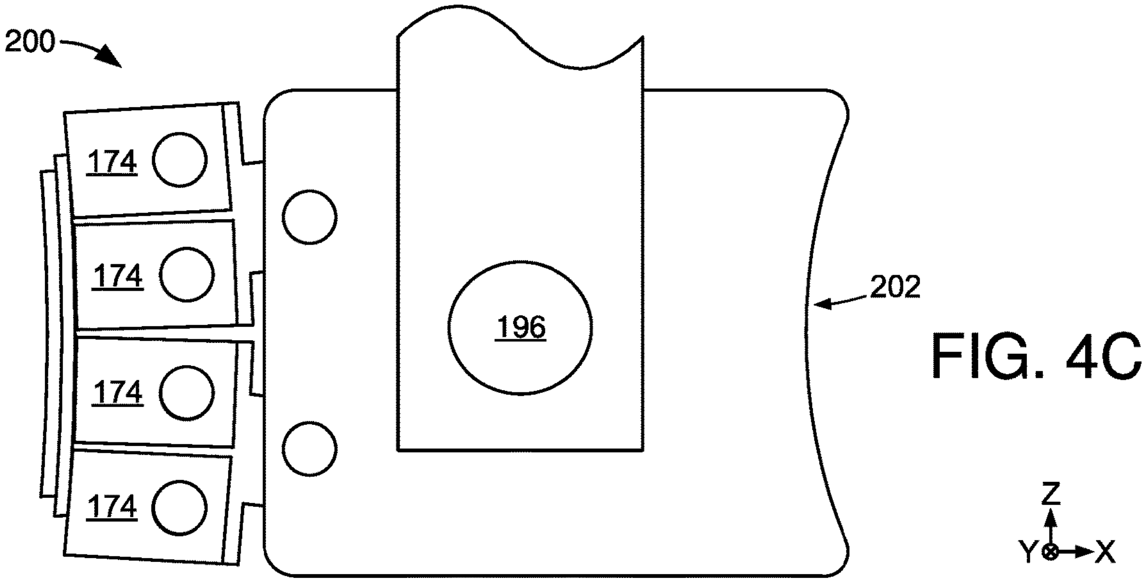

FIGS. 4A-4C respectively depict portions of example cauls that can be utilized with a fret press to provide automated, or manual, engagement with a fret to install the fret in a substrate groove. A first caul 170 has a rigid body 172 attached to a plurality of rigid teeth 174, such as two, ten, 2-10, or 2-20 teeth, that respectively have range of motion that allow different application of pressure onto a fret 110. Although not required or limiting, each tooth 174 can have an independent suspension that consists of pressure damping and/or distribution components, such as a pivot, spring, magnet, hydraulic chamber, pneumatic chamber, or a combination thereof, to provide consistent and uniform pressure onto a pressing surface of the fret 110.

As shown in the embodiment of FIG. 4A, a pair of teeth 174 are connected to a bridge 176 and each have independent pivots 178 that allow movement along the X-Y plane while the bridge 176 has a supplemental pivot 180 that additionally allows the bridge 176 to freely move along the X-Y axis. The combination of tooth pivots 178 and bridge pivots 180 allows for pressure from the caul body 172, and connected press 124, to be efficiently transferred throughout the fret 110 during installation into a groove. The combination of multiple teeth 174, bridges 176, and pivots 178/180 allows dynamic fret movements during groove installation to be compensated without damaging the fret, damaging the groove, misaligning the fret in the groove, or misorienting the fret in the groove.

It is contemplated that different teeth 174 and/or bridges 176 have differently configured suspensions, such as range of motion, damping aspects, or multiple pivots, that allow for customized application of force from a press through the body 172 to the fret 110. While the respective teeth 174 can each contact the fret 110 during installation into a substrate groove, some embodiments position a continuous bar 182 across each of the teeth 174 so that the bar 182 separates the respective teeth 174 from the fret 110. The continuous bar 182 may be configured with a uniform, or varying, thickness, along the Z axis, width, along the Y axis, and length, along the Z axis to control how pressure and force is applied to various portions of the fret, which can provide increasingly uniform distribution of force across the fret 110, particularly with the respective teeth 174 capable of freely moving and reacting to changes in force and movement of the fret 110 during installation.

The use of a plurality of articulating teeth 174 allows for frets 110 with varying cross-sectional configurations, such as pre-finished frets, to consistently be installed in a groove with predetermined alignment, depth, and orientation. However, the movement of teeth 174 can be imprecise in some fret installation situations, such as with some substrate materials, fret configurations, or types of pressing force utilized. Hence, some embodiments employ a single pressing surface configured with a size and shape conducive to distribute force and pressure throughout a fret 110 during substrate groove installation.

FIG. 4B illustrates an example caul 190 arranged with such single pressing surfaces. However, the caul 190 has multiple pressing surfaces that are differently configured to allow for different force and pressure profiles across a fret 110 when the fret 110 physically engages a substrate groove. For instance, a first pressing surface 192 can have a first surface configuration, such as width, length, and curvature, while a second pressing surface 194 has a different surface configuration that distributes press force evenly across a fret 110 and uniformly reacts to pressure encountered by the fret 110 when engaging the sidewalls of a substrate groove.

The caul 190 has a central axle 196 that allows a user, or automated component, select which pressing surface 194/196/198 to contact a fret 110 during groove installation. It is noted that while the caul 190 provides three differently configured pressing surfaces 192/194/198, any number of different single surfaces can be employed. The ability to efficiently select different pressing surfaces 192/194/198 allows for a customized fret 110 installation process where different surfaces 192/194/198 engage the fret 110 for assigned lengths of time with assigned pressures to reduce installation variability and risk of fret 110 misalignment and/or incorrect fret orientation within a groove.

FIG. 4C conveys another example caul 200 that provides both articulating teeth 174 and a single continuous pressing surface 202. With manual or automated selection of the different aspects of the caul 200, the fret 110 can be inserted into a substrate groove with a diverse array of pressure and force profiles due to the configuration of the respective sides of the caul 200. The utilization of at least one static pressing surface 202 and articulating teeth 174 to translate press force into precise fret position within a groove allows for efficient and accurate fret 110 installation in variety of different substrate materials, such as different woods, and different fret configurations, such as fret material, cross-sectional shape, and depth into a substrate. In some embodiments, a caul can be interchanged so that a single press can employ a variety of different cauls over time to provide optimal application of force for the current type of fret, substrate, and environmental conditions.

Figure 5:
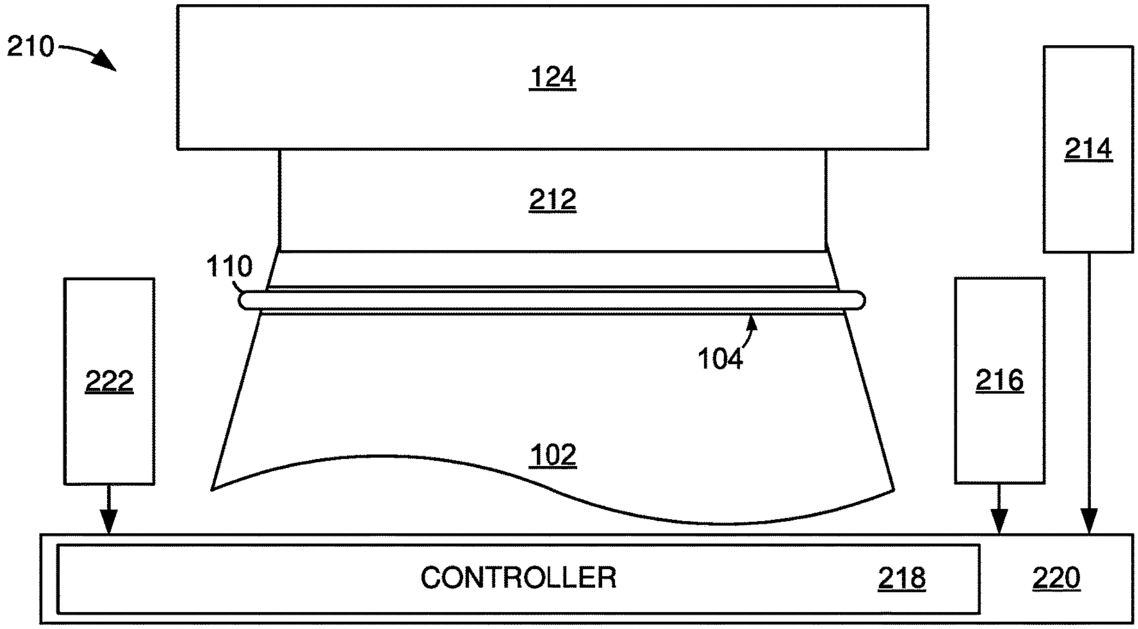
FIG. 5 depicts a block representation of portions of an example fret press system arranged and utilized in accordance with various embodiments.

While various cauls can manually be utilized to install frets into substrate grooves, various embodiments utilized sensors to automate fret installation so that some, or all, of fret physical insertion in a substrate groove is automatically conducted with pressing parameters optimized to current, real-time conditions. FIG. 5 depicts a block representation of an example fret press system 210 that can provide automatic, user-free installation of a fret into a substrate groove in accordance with assorted embodiments. A press 124 can apply force onto a fret 110 via one or more cauls 212 to insert the fret 110 into a groove 104 with a predetermined alignment, along the X axis, and orientation within the sidewalls of the groove 104.

A first sensor 214 can detect one or more variables of the press 124, such as power consumption, noise, mechanical range, and operating frequency, to discern how the press 124 is operating and what force is being applied to a connected caul 212. While not required, a second sensor 216 can detect conditions associated with the caul 212, such as position relative to the press 124, pressure, orientation, noise, and force per unit of a pressing surface/tooth of the caul 212. The utilization of multiple sensors 214/216 can allow for efficient, and perhaps redundant, detection of operating conditions in real-time by a controller 218 of a connected press module 220, which can be used to execute a pressing strategy to optimize fret installation parameters and provide precise fret placement within a substrate groove without damaging the groove or fret.

As shown, but not required, a third sensor 222 can be connected to the press module 220 and provide one or more sensed parameters about the fret 110, substrate 102, groove 104, or caul 212 while the fret 110 is pressed into the groove 104. That is, the third sensor 222 may consist of one or more detectors to sense at least one real-time operating condition when the caul 222 contacts the fret 110, such as pressure per inch, position relative to a reference mark, orientation relative to the shape of the groove 104, and depth within the groove 104. The collected information from the assorted sensors 214/216/222 allow the press module 220 to carry out various portions of a predetermined pressing strategy to maintain optimal installation parameters from at least the press 124, caul 212, fret 110, and substrate 102 without involving user interaction.

Figure 6:
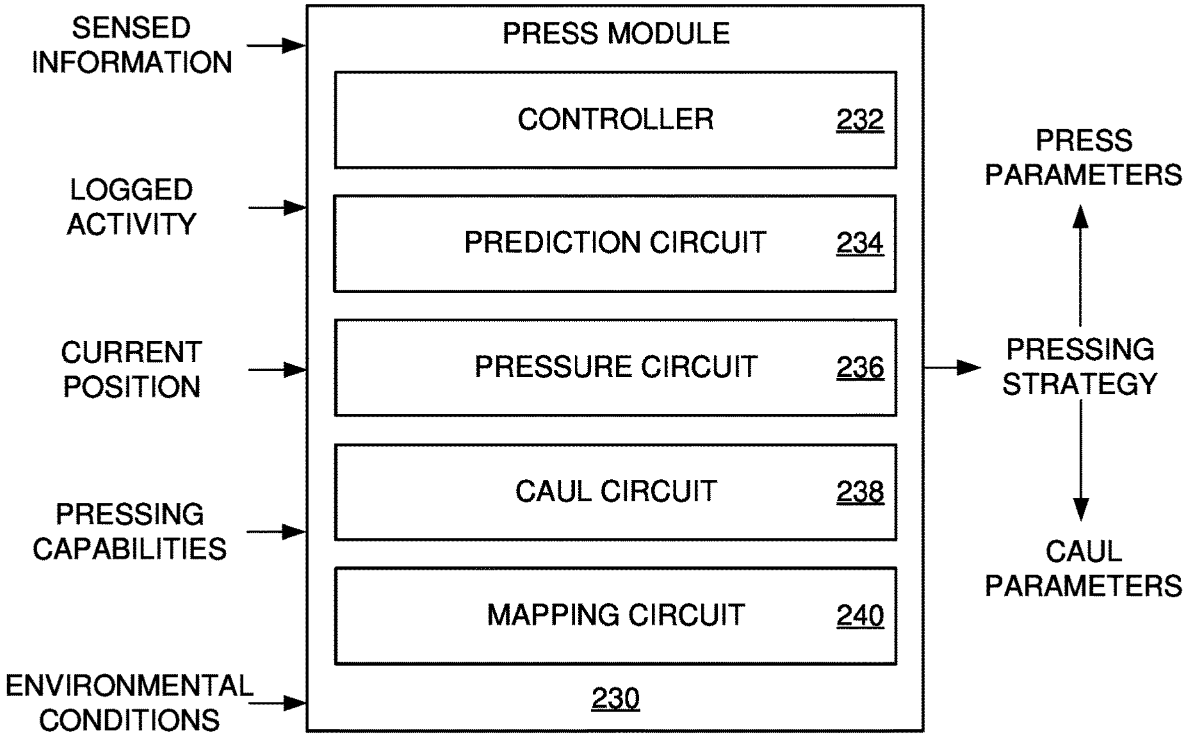
FIG. 6 depicts a block representation of an example press module that can carry out various embodiments to install a fret.

FIG. 6 depicts a block representation of an example press module 230 that can be utilized as part of a fret press system in accordance with some embodiments. The module 230 can be resident as hardware and/or software that is connected to at least one press that articulates a caul relative to a substrate, as generally conveyed in FIG. 5. The press module 230 can intake any number of inputs that are processed by a local controller 232, such as a microprocessor or other programmable circuitry, to generate a pressing strategy that prescribes a variety of different operational parameters to establish and maintain optimized fret installation settings to ensure precise fret placement and alignment within a substrate groove.

In the non-limiting embodiment of FIG. 6, the press module 230 intakes information from various connected sensors, logged fret pressing activity, current pressing capabilities, and current environmental conditions to generate a pressing strategy that prescribes at least press settings, caul settings, and operational corrections. That is, the press module 230 can receive data from any type and number of sensors that monitor operation of at least a press, caul, fret, and substrate groove. The module controller 232 can additionally receive past logged pressing activity and the current operational capabilities of the press and caul, which allow the module 230 to generate press and caul initial settings, as well as operational corrections, with respect to current environmental conditions, such as temperature, substrate density, humidity, and fret temperature, to engage a fret with prescribed force directed to apply pressure onto the fret to insert the fret into a substrate groove with maximum accuracy and efficiency.

It is contemplated that the module controller 232 can solely conduct the processing and generation of a pressing strategy. However, various embodiments of the pressing module 230 employ other module circuitry to supplement the capabilities of the controller 232 to create and manage the various settings and corrections of the pressing strategy to provide the best operating parameters to install a fret with maximum precision and accuracy. For instance, a prediction circuit 234 can translate one or more current pressing capabilities and environmental conditions with past pressing operational activity to forecast one or more pressing events and/or operational conditions that may happen in the future.

A non-limiting example of prediction circuit 234 operation involves predicting fret movement, pressure fluctuations, caul movement, and overall pressing time from sensed current capabilities and conditions along with past logged activity. Such predictions allows the module controller 232 to prescribe pressing strategy settings and/or corrections, such as press force, caul pressing surface utilized, and triggers to change caul pressing surface configurations, that can be executed efficiently due to the pre-existing pressing strategy to prevent fret misalignment and inadvertent movement to produce accurate fret installation in a groove.

The input information and prediction of future pressing conditions allows a pressure circuit 236 to evaluate different press operating conditions and prescribe dynamic press parameters, such as voltage, frequency, piston position, and/or power consumption, to install a fret without unwanted fret movement or engagement with a substrate groove. The pressure circuit 236 can prescribe one or more triggers, such as detected vibration, noise, movement, or friction, that prompt adjustment of one or more pressing parameters of the press, caul, or both. It is noted that as the caul comes into physical contact with a fret, there may be an anvil or other rigid object to counteract the pressure of the caul. Similarly, a caul circuit 238 can evaluate different caul operating conditions, such as different possible caul positions, pressing surfaces, and teeth suspensions, to prescribe operational triggers, such as detected pressure, time, friction, heat, or press power consumption, that prompt alteration of one or more pressing conditions of the caul, press, or both.

Some embodiments of the press module 230 employ a mapping circuit 240 that identify physical features of a substrate groove and/or fret to provide the pressing strategy with at least the shape and size of the components, which allows for more precise selection of press forces, timing, and caul pressing surface selection to prevent inadvertent friction, heat, or fret movement during installation in the substrate groove. For instance, the mapping circuit 240 can utilize one or more camera, acoustic, environmental, or laser sensors to detect the physical condition of the fret and/or groove, such as substrate density, substrate temperature, sidewall length, depth, fret cross-sectional shape, fret position relative to the groove, and location of applied force onto the fret from the caul. The real-time identification of physical features by the mapping circuit 240 while the caul is pressing the fret into the substrate groove allows the press module 230 to quickly adapt to expected and unexpected changes in fret position before being fully inserted into the groove, which prevents fret and groove damage from laborious fret removal after being fully inserted.

The real-time identification of physical features and conditions with the mapping circuit 240 provides the prediction circuit 234 with information to forecast how actions of an existing pressing strategy will conclude. If predicted fret position, orientation, or alignment is not forecasted to be optimal, the press module 230 can alter one or more pressing actions, such as pressing force, caul pressing surface selection, and/or pressing timing, to prevent the forecasted fret installed condition. Some embodiments of the use of the mapping circuit 240 in combination with the prediction circuit 234 trigger the stoppage of a completely automated pressing protocol in response to a detected/predicted fret incorrect installed condition, which can prompt a human user to assess and verify restarting fret installation once one or more fret corrections generated by the press module 230 are conducted, such as fret moving, caul adjustment, or groove lubrication.

Figure 7:
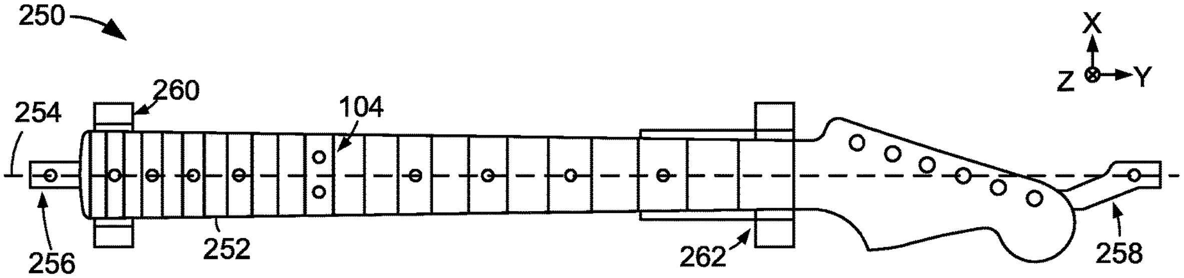
FIG. 7 displays portions of an example instrument fret press system in which assorted embodiments of a fret press can be practiced.

FIG. 7 depicts portions of an example instrument fret press system 250 which can be used for completely autonomous, completely manual, or a combination thereof fret installation. A stringed instrument neck 252 is configured with assorted alignment features that ensure the stable maintenance of the position of assorted neck grooves 104 while frets are physically pressed and installed. It is noted that the instrument neck 252 is disassembled from an instrument body, which allows for a neck centerline 254 to be congruent with a first alignment protrusion 256 and a second alignment protrusion 258, as shown. The respective alignment protrusions 256/258 can be any size, shape, and position relative to the neck 252 to allow the centerline 254 to be identified and maintained by a human user and/or sensors connected to a press module.

Accurate tracking of the neck centerline 254 can correspond with one or more neck positioning features that physically restrict movement of the neck 252 while frets are installed. For instance, a first clamp 260 can contact opposite sides of a first portion of the neck 252, along the X-Y plane, while a second clamp 262 contacts opposite sides of a second portion of the neck 252, along the X-Y plane. While any number, type, and size of clamps, grippers, vices, or other retention means can be concurrently used to maintain a stable neck 252 position and orientation during fret installation in a groove 104, various embodiments employ the two self-centering clamps 260/262 shown in FIG. 7 that apply continuous force onto the neck 252 to maintain the neck centerline's 254 position despite the application of pressure onto different portions of the neck 252 over time.

Although the physical retention of the neck 252 can allow more efficient manual installation of frets, the combination of automated fret installation and neck 252 position manipulations and maintenance via one or more sensors provides optimal automatic correction and/or prevention of neck 252 motion that could jeopardize the accuracy and efficiency of fret installation. The combination of the physical retention of the neck 252 and automated fret installation allows a fret press system to overcome challenges associated with working with organic neck 252 materials that can be prone to move due to environmental conditions, such as humidity, moisture content, and temperature. The ability to micro-adjust the physical position and/or retention force applied to the neck 252 based on sensed environmental conditions and/or neck 252 orientation allows for reliable and consistent groove acceptance of a fret, which contrasts dynamic neck 252 conditions that produce inadvertent heat and friction during fret installation.

Figure 8:
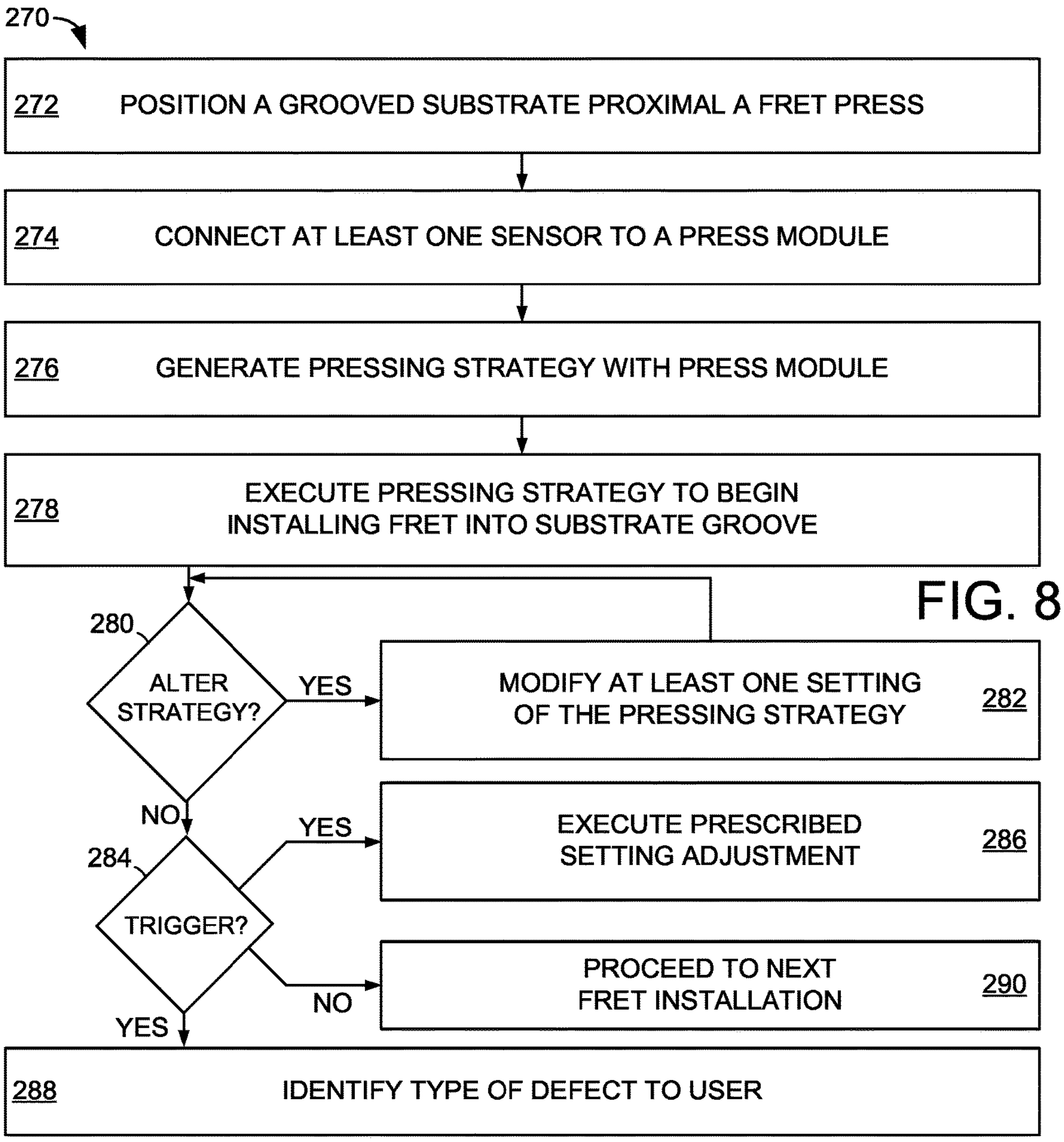
FIG. 8 is a flowchart of an example fret press routine that may be executed by the assorted embodiments of FIGS. 1-7.

The assorted embodiments of FIGS. 1-7 can be utilized in the example fret press routine 270 displayed in FIG. 8. Initially, a substrate can be positioned relative to a fret press in step 272 so that at least one groove is exposed to a caul connected to the press. It is contemplated, but not required, that the positioning of the substrate in step 272 involves the physical retention of the substrate via a self-centering clamp in order to align a centerline of the substrate with a reference mark of the press and/or caul, such as perpendicular to a longitudinal axis of the caul. The physical retention and/or positioning of the grooved substrate in step 272 can occur before, during, or after connection of a press module to at least one sensor and the fret press in step 274.

The press module can proceed to generate a pressing strategy in step 276 that prescribes operational parameters and/or settings that dictate how frets are going to be inserted into respective substrate grooves. The pressing strategy can have one or more proactive and/or reactive operational adjustments, such as changes in pressing force, fret position, caul position, or caul pressing surface selection, that operate to physically insert a fret into a groove of a substrate. The pressing strategy can prescribe a variety of different caul and/or press operational settings that can be executed to correct sensed conditions, such as excess friction, heat, or fret misorientation, or prevent a fret from reaching a predetermined predicted operational threshold that corresponds with the fret being improperly installed, such as excessive pressing force, fret rotation, or fret misalignment.

The combination of pressing strategy operational settings that correct detected, real-time fret conditions or prevent operational thresholds from being reached allows the press module to accommodate a diverse variety of installation scenarios and encountered situations. The pre-existing generation of assorted operational settings of the pressing strategy further allows for efficient modification of existing operations without having to generate altered caul, fret, substrate, or press operations. It is contemplated that the pressing strategy generated in step 276 correlates different operational settings with different mapped aspects of a fret and/or groove. For instance, the pressing strategy can prescribe a first set of operational settings when the sidewalls of the fret are mapped to be parallel to the sidewalls of the substrate groove and a different second set of setting in response to the sidewalls being mapped as non-parallel.

The pressing strategy can be created in step 276 to be responsive and adaptive to a variety of different inputted information, as generally conveyed in FIG. 6. It is noted that the inputted information can be manually and/or automatically provided to the press module, which can trigger the press module to alter one or more operational settings to conduct reactive and/or proactive fret installation actions. Regardless of the number, type, and complexity of the operational settings present in the pressing strategy, step 278 executes one or more installation actions with caul, fret, and press settings established by the pressing strategy.

While the strategy is being executed, decision 280 can continuously, or sporadically, evaluate if the existing pressing strategy is optimal for current and predicted fret installation conditions. That is, decision 280 can determine if the settings and operational adjustments of the pressing strategy are the best manners of correcting and/or preventing fret installation errors. If not, step 282 modifies the pressing strategy to optimize the prescribed operational settings to current and predicted future fret installation conditions. For example, step 282 may identify current pressing strategy settings are not optimal for detected, or predicted, conditions, such as substrate moisture content, air temperature, or fret material hardness, before issuing new or altered operational settings that provide optimal fret installation with respect to the fret and substrate groove conditions.

In the event that no strategy alterations are necessary, decision 284 evaluates if an operational trigger of the pressing strategy has been reached to prompt an adjustment in one or more operational settings in accordance with the strategy. As a non-limiting example, decision 284 can respond to an identified, or predicted, parameter of fret installation by modifying at least one operational setting of the caul, press, or fret in step 286. In some situations, the press module can identify that an irreversible fret installation error has occurred based on detected conditions and the operational evaluations prescribed by the pressing strategy. Identification of an error can prompt the press module to alter a user of the presence of the error in step 288 and, in some embodiments, identify the type and severity of the encountered error, such as if the fret and/or groove can be reused with or without user processing.

Through the execution and alteration of operational settings in accordance with the pressing strategy, a fret can be properly inserted into a substrate groove, which is detected by one or more system sensors. The system can verify that a fret is installed correctly and proceed to execute step 290 where the pressing strategy is conducted to insert a different fret into a different substrate groove. It is contemplated that execution of step 290 can correspond with automated or manual positioning of a fret atop a groove, assessment of the current conditions of the fret and groove, and selection of pressing strategy operational settings to initiate customized insertion of the fret into the substrate groove.

In accordance with various embodiments of a fret press system, manual and/or automated installation of a fret into a substrate groove can be practiced. The generation of a pressing strategy allows for efficient alteration of fret installation settings in response to detected and/or predicted fret, caul, or groove conditions. The ability to select different caul pressing surface configurations allows pre-finished frets with dynamic cross-sectional sizes and/or shapes and rounded ends to be automatically installed into substrate grooves with optimized and adaptive installation settings. The use of assorted sensors to monitor fret installation conditions allows for quick and efficient operational deviations that mitigate or prevent fret misalignment, inadvertent rotation, and otherwise incorrect fret position within a substrate groove.

Even though numerous characteristics and advantages of the various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising a caul positioned over a groove in a substrate, the caul having a plurality of pressing surfaces arranged to distribute pressure from a press across a surface of a fret while the fret is inserted into the groove, the caul connected to, and configured for rotation about, a central axle.

2. The apparatus of claim 1, wherein each of the separate pressing surfaces are adjustable via an adjustment fastener.

3. The apparatus of claim 1, wherein each of the separate pressing surfaces is connected to the press via a dynamic suspension.

4. The apparatus of claim 1, wherein each of the plurality of pressing surfaces are separate and contact the fret concurrently and independently.

5. The apparatus of claim 1, wherein each pressing surface of the plurality of pressing surfaces has a different continuously curvilinear surface configuration.

6. The apparatus of claim 1, wherein each pressing surface of the plurality of pressing surfaces is connected to a rigid body via at least two separate pivots.

7. A method comprising:

positioning a fret atop a groove in a substrate;

contacting the fret with a caul connected to a press;

forcing the fret into the groove with the caul with a first pressure;

sensing an incorrect fret position in the groove with a sensor connected to the press;

adjusting the caul to correct the sensed incorrect fret position; and confirming a position of the fret in the groove with the sensor.

8. The method of claim 7, wherein the fret is a pre-finished fret with a variable cross-sectional shape along a length of the pre-finished fret.

9. The method of claim 7, wherein the incorrect fret position is a misalignment within the groove.

10. The method of claim 7, wherein the caul is adjusted by moving a tooth extending from the caul to contact the fret.

11. The method of claim 7, wherein the caul is adjusted by rotating the caul around an axis to present a different pressing surface to the fret.

12. The method of claim 7, wherein the caul is adjusted by changing the first pressure to a second pressure.

13. The method of claim 7, wherein the sensor is configured to detect at least one of:

one or more variables of the apparatus;

one or more conditions associated with the caul; and one or more parameters of at least one of a fret, the substrate, the groove, or the caul.

14. The method of claim 7, wherein the caul comprises a plurality of distinctly shaped pressing surfaces.

15. A method comprising:

positioning a fret atop a groove in a substrate; and pressing the fret into the groove by contacting the fret with a caul connected to a press, the caul comprising a rigid frame and a plurality of articulating teeth each pivotably coupled for independent rotation with respect to the rigid frame to distribute an insertion force applied to a pressing surface of the fret.

16. The method of claim 15, wherein an adjacent pair of the plurality of articulating teeth are pivotably coupled to a bridge member, the bridge member in turn pivotably coupled to the rigid frame.

17. The method of claim 15, wherein each of the plurality of articulating teeth is provided with a dynamic suspension to control the applied insertion force upon the pressing surface of the fret.

18. The method of claim 15, wherein the caul further comprises a continuous bar which contactingly engages the pressing surface of the fret, the continuous bar coupled to each of the plurality of articulating teeth on a side opposite the rigid frame.

19. The method of claim 15, wherein the caul comprises at least first and second pressing surfaces, and the method further comprises rotating the caul about a central hub to present a selected one of the first or second pressing surfaces into contacting engagement with the pressing surface of the fret.

20. The method of claim 15, further comprising steps of sensing an incorrect fret position in the groove with a sensor connected to the press, and adjusting the caul to correct the sensed incorrect fret position.

* * * * *